United States Patent
Grybush et al.

(10) Patent No.: US 12,075,949 B2
(45) Date of Patent: Sep. 3, 2024

(54) KNIFE HOLDER AND CUTTING BOARD FOR DRYING RACK

(71) Applicant: Kohler Co., Kohler, WI (US)

(72) Inventors: Evan Grybush, Belgium, WI (US); Erika Kovesdi, Kohler, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/547,136

(22) Filed: Dec. 9, 2021

(65) Prior Publication Data

US 2022/0192430 A1 Jun. 23, 2022

Related U.S. Application Data

(60) Provisional application No. 63/128,464, filed on Dec. 21, 2020.

(51) Int. Cl.
*A47J 47/20* (2019.01)
*A47G 21/14* (2006.01)
*A47J 47/00* (2006.01)

(52) U.S. Cl.
CPC .............. *A47J 47/20* (2013.01); *A47G 21/14* (2013.01); *A47J 47/005* (2013.01)

(58) Field of Classification Search
CPC .......... A47J 47/20; A47J 47/005; A47G 21/14
See application file for complete search history.

(56) References Cited

U.S. PATENT DOCUMENTS

| | | | | |
|---|---|---|---|---|
| 514,096 A * | 2/1894 | Sheffield | ................... | B25B 7/02 269/295 |
| 602,125 A * | 4/1898 | Burrows | ................ | A47K 3/122 182/119 |
| 1,452,418 A | 4/1923 | Cunneen | | |
| 2,691,237 A * | 10/1954 | Jacob | ....................... | A47J 47/20 4/640 |
| 2,930,558 A | 3/1960 | Bugay | | |
| 3,213,565 A * | 10/1965 | Grosz | .................... | A47K 3/001 211/74 |
| 3,625,162 A * | 12/1971 | Crew | ....................... | A47J 47/20 248/172 |
| 4,041,964 A * | 8/1977 | Shamoon | .............. | A47J 47/005 108/26 |
| 4,100,676 A * | 7/1978 | Ferguson | ............. | A47G 19/022 33/525 |
| 4,189,132 A * | 2/1980 | Di Russo | .............. | B26B 29/063 269/295 |

(Continued)

FOREIGN PATENT DOCUMENTS

DE 19509739 C1 * 11/1996 ............ A47J 47/005
EP 0900543 A1 * 3/1999
(Continued)

*Primary Examiner* — Stanton L Krycinski
(74) *Attorney, Agent, or Firm* — Husch Blackwell LLP (57) ABSTRACT

A cutting board is provided. The cutting board includes a first surface, a second surface, a third surface, and a first channel interrupting the third surface. The first surface lies within a first plane and comprises a first perimeter. The second surface extends away from the first surface proximate to the first perimeter. The third surface lies within a second plane and includes a second perimeter. The first channel extends along the second plane and interrupts the third surface.

11 Claims, 8 Drawing Sheets

(56) References Cited

U.S. PATENT DOCUMENTS

| | | | | |
|---|---|---|---|---|
| 4,243,184 | A * | 1/1981 | Wright | A47J 43/25 269/289 R |
| 4,456,021 | A * | 6/1984 | Leavens | E03C 1/182 134/115 R |
| 4,765,603 | A * | 8/1988 | Huppert | A47J 47/005 269/302.1 |
| 4,840,361 | A * | 6/1989 | Richter | A47J 47/005 269/289 R |
| 4,964,323 | A * | 10/1990 | Fortney | B26B 29/063 83/167 |
| 5,312,178 | A | 5/1994 | King | |
| 5,406,656 | A * | 4/1995 | Somerton | A47J 47/20 4/631 |
| 5,794,797 | A | 8/1998 | Kuntz | |
| 5,904,271 | A * | 5/1999 | Collins | A47J 47/005 222/143 |
| 6,182,305 | B1 * | 2/2001 | O'Connell | F24C 15/30 4/631 |
| 6,341,770 | B1 * | 1/2002 | Landherr | A47J 47/005 269/302.1 |
| 6,478,292 | B1 * | 11/2002 | Sellers | A47J 47/005 269/286 |
| 6,508,368 | B1 | 1/2003 | Arce, Jr. | |
| 6,666,343 | B1 * | 12/2003 | Liu | A47G 21/14 248/37.3 |
| 6,789,792 | B1 * | 9/2004 | Angland | A47J 47/005 269/302.1 |
| 6,889,969 | B2 * | 5/2005 | Diermeier | A47J 47/005 269/289 R |
| 6,910,685 | B2 * | 6/2005 | Sellers | A47J 47/005 269/286 |
| 7,086,099 | B2 * | 8/2006 | Rocci | A47J 47/20 4/656 |
| 7,267,238 | B2 | 9/2007 | Yang et al. | |
| 7,568,239 | B2 * | 8/2009 | Spruner von Mertz | A47J 47/20 4/654 |
| 8,070,148 | B2 * | 12/2011 | Nishida | A47J 47/005 269/302.1 |
| 8,241,688 | B2 * | 8/2012 | Aguirre | A47J 47/005 426/518 |
| 8,448,552 | B2 * | 5/2013 | Hoffman | B26B 29/063 83/13 |
| 8,690,133 | B1 * | 4/2014 | Hauser | A47J 47/005 269/302.1 |
| 9,574,333 | B2 * | 2/2017 | O'Brien | A47J 47/005 |
| D838,554 | S | 1/2019 | Thompson et al. | |
| 10,244,900 | B2 * | 4/2019 | Getzinger | G06Q 90/00 |
| 10,329,755 | B2 * | 6/2019 | Zver | E03C 1/22 |
| 10,667,652 | B2 * | 6/2020 | Getzinger | B26B 29/063 |
| 11,027,446 | B2 * | 6/2021 | Stojanovski | B26B 29/063 |
| 11,083,338 | B2 * | 8/2021 | Getzinger | B26B 29/063 |
| 2003/0067105 | A1 * | 4/2003 | Chen | A47J 47/005 269/289 R |
| 2007/0007705 | A1 * | 1/2007 | Chen | A47J 47/005 269/289 R |
| 2008/0149552 | A1 * | 6/2008 | Murphy | A47J 47/005 210/251 |
| 2010/0275369 | A1 * | 11/2010 | Eilmus | A47J 47/005 4/631 |
| 2010/0275820 | A1 * | 11/2010 | Damm | A47B 97/00 108/24 |
| 2011/0056016 | A1 * | 3/2011 | Mun | E03C 1/186 4/654 |
| 2011/0169208 | A1 * | 7/2011 | Almeda | A47J 47/005 269/289 R |
| 2012/0210841 | A1 * | 8/2012 | Getzinger | A47G 19/022 269/295 |
| 2012/0266377 | A1 | 10/2012 | Eilmus | |
| 2013/0036882 | A1 * | 2/2013 | Getzinger | B26D 3/245 269/295 |
| 2013/0241127 | A1 * | 9/2013 | Yang | A47J 47/005 269/15 |
| 2018/0249886 | A1 | 9/2018 | Thompson et al. | |

FOREIGN PATENT DOCUMENTS

| | | |
|---|---|---|
| EP | 1275786 A2 * | 1/2003 |
| EP | 2294956 A1 * | 3/2011 |
| GB | 2310590 A * | 9/1997 |
| GB | 2 495 870 A | 4/2013 |
| KR | 20100006148 U * | 6/2010 |
| KR | 20130126861 A * | 11/2013 |
| WO | WO-0119226 A1 * | 3/2001 |

* cited by examiner

KNIFE HOLDER AND CUTTING BOARD FOR DRYING RACK

CROSS-REFERENCE TO RELATED PATENT APPLICATIONS

This application claims the benefit of and priority to U.S. Provisional Patent Application No. 63/128,464, filed on Dec. 21, 2020, the entire disclosure of which is hereby incorporated by reference herein.

BACKGROUND

The present disclosure relates generally to accessories for a sink. More specifically, the present disclosure relates to a drying rack for a sink and accessories for the drying rack.

SUMMARY

At least one embodiment relates to a cutting board. The cutting board includes a first surface, a second surface, a third surface, and a first channel interrupting the third surface. The first surface lies within a first plane and comprises a first perimeter. The second surface extends away from the first surface proximate to the first perimeter. The third surface lies within a second plane and includes a second perimeter. The first channel extends along the second plane and interrupts the third surface.

Another embodiment relates to a knife holder. The knife holder includes a first portion and a second portion. The first portion includes a first opening and a second opening. The second portion includes a first open end, a second closed end, and a receiver cavity extending between the first open end and the second closed end. The first open end is configured for coupling with the first portion such that the first opening, the second opening, and the first open end are in fluid communication with one another when the first portion is coupled to the second portion. When the first portion is coupled to the second portion, the knife holder is configured to receive an elongate utensil may be received within both the first portion and the second portion.

Another embodiment relates to a drying assembly. The drying assembly includes a drying rack and a cutting board. The drying rack includes a first rod and a second rod positioned away from the first rod by a gap distance. The first rod and the second rod each define a rod width. The cutting board comprises a cutting surface and an engagement surface opposite to the cutting surface, the engagement surface includes a first channel configured to receive the first rod and the second channel configure to receive the second rod.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a cutting board and a knife holder for a drying rack are provided. The drying rack may be a roll-up drying rack formed from a plurality of parallel rods spaced apart from one another by a predetermined distance. The plurality of parallel rods may be coupled together with a flexible strap that runs along the two ends of the plurality of parallel rods. A gap is defined between two adjacent parallel rods from the plurality of parallel rods. The cutting board is structured to engage the parallel rods of the drying rack to prevent the cutting board from sliding off the drying rack. For example, the cutting board may include a plurality of channels along a bottom surface that receive the plurality of parallel rods. The knife holder may be extended through the plurality of parallel rods and is configured to receive a kitchen utensil, such as a knife. The blade of the knife is inserted into the knife holder. The knife holder surrounds the blade of the knife to prevent accidental contact with the blade. The knife holder also maintains a downward orientation of the blade to prevent the knife from rotating while drying.

Figure 1:
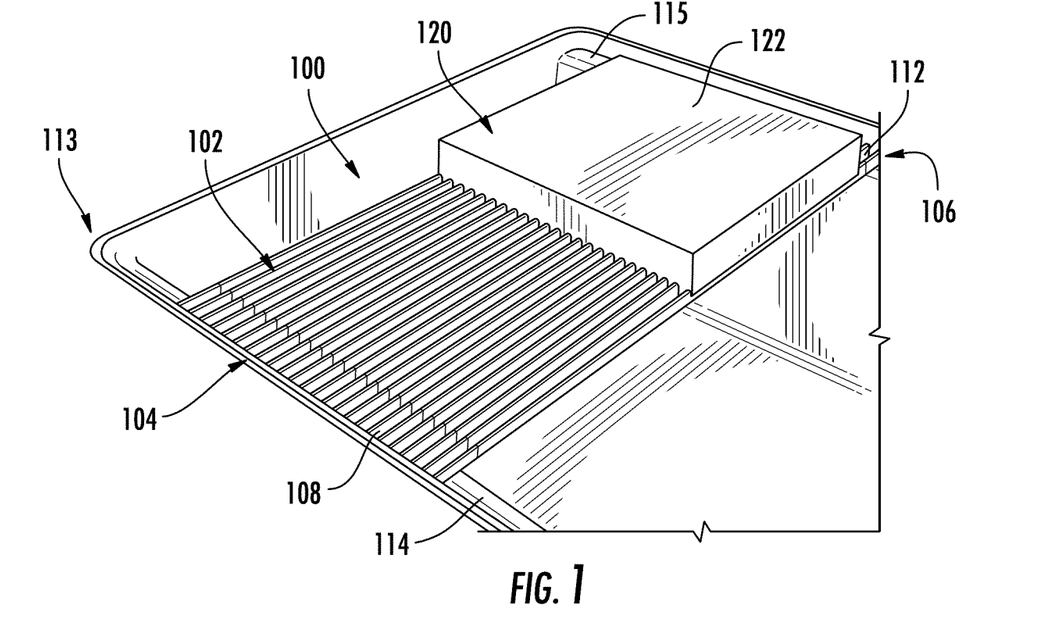
FIG. 1 is a perspective view of a drying rack and a cutting board, according to an example embodiment.
Figure 2:
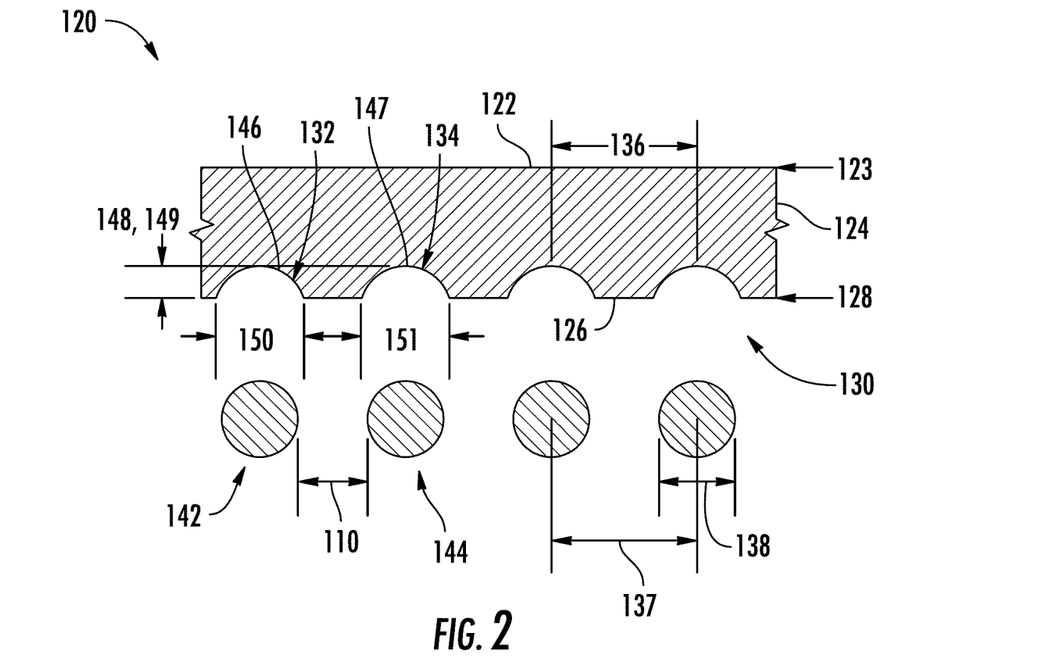
FIG. 2 is a side, cross-sectional view of the cutting board of FIG. 1, according to an example embodiment.

Referring now to FIG. 1, a drying rack 100 is shown having a plurality of parallel rods 102. The drying rack 100 defines a first rack end 104 and a second rack end 106 at opposite ends of the plurality of parallel rods 102. A first strap 108 is coupled to the drying rack 100 at the first rack end 104. The first strap 108 receives an end of each of the plurality of parallel rods 102 and maintains a gap between each of the plurality of parallel rods 102, shown as a rod gap 110 (FIG. 2). A second strap 112, similar to the first strap 108, is coupled to the second rack end 106. The second strap 112 receives an end of each of the plurality of parallel rods 102 and maintains the rod gap 110 between each of the plurality of parallel rods 102 such that the rod gap 110 remains constant between the first rack end 104 and the second rack end 106.

The drying rack 100 may extend across the opening of a sink 113 or wash basin. For example, the first rack end 104 and the second rack end 106 may be positioned on a countertop on opposite sides of the sink 113 such that the drying rack 100 is suspended over a basin of the sink 113. In some embodiments, the sink 113 includes a pair of ledges 114, 115 configured to receive the first rack end 104 and the second rack end 106.

An accessory is shown positioned on the drying rack 100, shown as a cutting board 120. The cutting board 120 defines a first surface 122 (e.g., cutting surface, front surface, etc.), a second surface 124 (e.g., side surface), and a third surface 126 (e.g., bottom surface, base surface, rear surface, etc.). The first surface 122 is substantially planar and lies within a first plane 123. In some embodiments, the first surface 122 defines the first plane 123. The first surface 122 is formed from a hard, resilient material, such as wood, plastic, corian, glass, metal, marble, or a similar material. When the cutting board 120 is positioned on the drying rack 100, the first surface 122 may be parallel to at least one of the plurality of parallel rods 102. The first surface 122 may define any shape of any size. While the first surface 122 is shown having a rectangular shape, the first surface 122 may instead define a square, oval, circle, polygon, racetrack, obround, hourglass, lima bean, or any similar shape. In some embodiments, the first surface 122 includes an aperture that extends through the entirety of cutting board 120, thus defining a donut shape.

The second surface 124 is contiguous with both the first surface 122 and the third surface 126, the second surface 124 extending between the first surface 122 and the third surface 126. The second surface 124 extends about a first perimeter of the first surface 122 irrespective of the shape of the first surface 122. The second surface 124 may be cut by a router such that the second surface 124 has a non-planar profile, such as a chamfer, cove, ogee, beading, bullnose, or similar profile. In some embodiments, the second surface 124 is concave to provide a grip to the user to lift the cutting board 120. In some embodiments, the second surface 124 is convex to facilitate cleaning and to avoid sharp edges. In some embodiments, such as when the first surface 122 and the third surface 126 are different shapes, the second surface 124 provides a continuous and contiguous transition between the first surface 122 and the third surface 126. For example, the second surface 124 may be tapered from the first surface 122 to the third surface 126.

The third surface 126 is opposite to the first surface 122 and lies, at least in part, within a second plane 128. The second surface 124 is continuous with a second perimeter of the third surface 126. In some embodiments, the first plane 123 and the second plane 128 are substantially parallel (e.g., are at a zero angle relative) to each other. In some embodiments, the first plane 123 and the second plane 128 are positioned at a non-zero angle relative to each other. For example, the first plane 123, and thus the first surface 122, may be sloped in a direction to facilitate the removal of food waste and water from the first surface 122.

Figure 3:
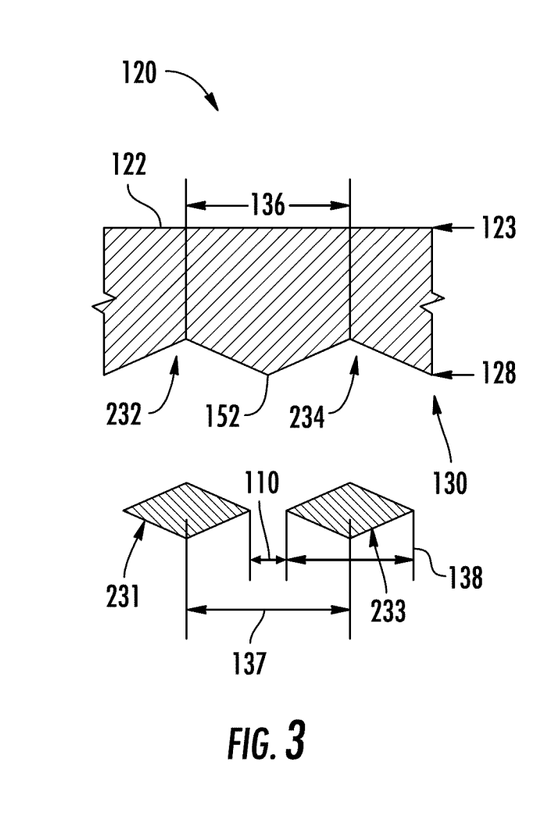
FIG. 3 is a side, cross-sectional view of the cutting board of FIG. 1, according to another example embodiment.
Figure 4:
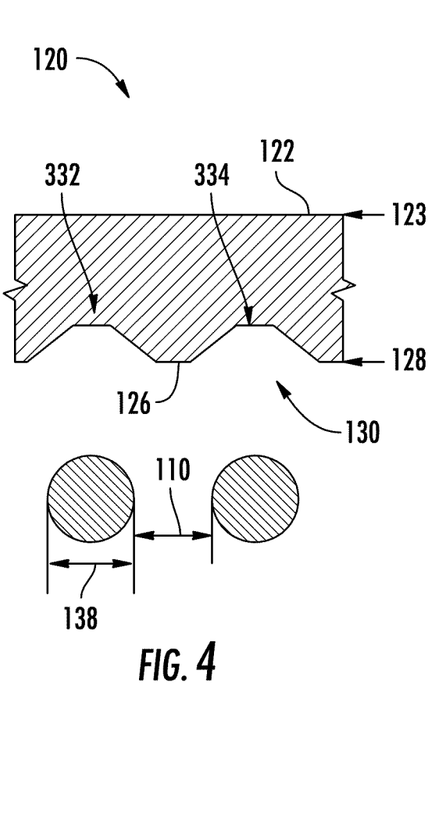
FIG. 4 is a side, cross-sectional view of the cutting board of FIG. 1, according to yet another example embodiment.

The third surface 126 is structured to interface with the plurality of parallel rods 102. As shown in FIGS. 2-4, the third surface 126 comprises a plurality of channels 130 that extend into the cutting board 120 in a direction away from the second plane 128 and toward the first plane 123. Specifically, the cutting board 120 includes a first channel 132 configured to receive a first rod 142 and a second channel 134 configured to receive a second rod 144. The first rod 142 and the second rod 144 define a rod width 138.

The first channel 132 extends in a direction substantially parallel to the second plane 128. The first channel 132 defines a cross-sectional shape having a first channel profile 146. The first channel profile 146 remains constant along the length of the first channel 132. In some embodiments, the first channel 132 is linear. The first channel 132 intersects the second perimeter of the third surface 126, which provides a "through channel" that is open at both ends where the first channel 132 interrupts the second surface 124. In some embodiments, the first channel profile 146 changes along the length of the first channel 132. The first channel profile 146 defines a first channel height 148 and a first channel width 150. The first channel height 148 is defined as a distance between the second plane 128 and a point of the first channel profile 146 positioned furthest away from the second plane 128. The first channel width 150 is defined as a distance between two points of the first channel profile 146 that intersect the second plane 128. In some embodiments, the first channel height 148 and the first channel width 150 are the same. In some embodiments, the first channel width 150 is greater than the first channel height 148. In some embodiments, the first channel height 148 is approximately one-half of the first channel width 150. In some embodiments, the first channel profile 146 may be a semicircle. In some embodiments, the first channel width 150 is at least 300% of the first channel height 148. For example, the first channel profile 146 may be a flattened triangle. Such a profile may be easier to clean since it is shallower than a semicircle profile.

The second channel 134 defines a cross-sectional shape having a second channel profile 147. The second channel profile 147 remains constant along the length of the second channel 134. In some embodiments, the second channel profile 147 changes along the length of the second channel 134. In some embodiments, the first channel profile 146 and the second channel profile 147 are substantially similar such that both the first channel 132 and the second channel 134 are configured to receive the first rod 142. In some embodiments, the first channel profile 146 and the second channel profile 147 are different. For example, the first channel profile 146 may be different from the second channel profile 147.

The second channel profile 147 defines a second channel height 149 and a second channel width 151. The second channel height 149 is defined as a distance between the second plane 128 and a point of the second channel profile 147 positioned furthest away from the second plane 128. In some embodiments, the first channel height 148 and the second channel height 149 are the same. The second channel width 151 is defined as a distance between two points of the second channel profile 147 that intersect the second plane 128. In some embodiments, the second channel height 149 and the second channel width 151 are the same. In some embodiments, the second channel height 149 is approximately one-half of the second channel width 151. For example, the second channel profile 147 may be a semicircle. In some embodiments, the second channel width 151 is at least 300% of the second channel height 149. For example, the second channel profile 147 may be a flattened triangle. Such a profile may be easier to clean since it is shallower than a semicircle profile.

The first channel 132 and the second channel 134 are separated by a distance, shown as a channel gap 136. The channel gap 136 is measured as a distance between the middle of the first channel 132 and the middle of the second channel 134. The first channel 132 and the second channel 134 may maintain the channel gap 136 along their respective lengths. In some embodiments, the first channel 132 and the second channel 134 are substantially parallel. The channel gap 136 is substantially equal to a gap between the rods, shown as a rod distance 137. The rod distance 137 is measured as a distance between the center of the first rod 142 and the second rod 144.

Figure 5:
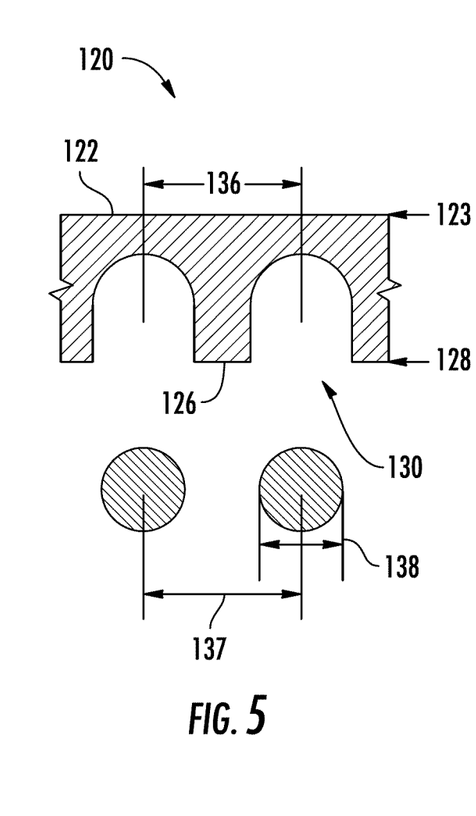
FIG. 5 is a side, cross-sectional view of the cutting board of FIG. 1, according to even yet another example embodiment.

As briefly outlined above, the first channel profile 146 and the second channel profile 147 may form any number of cross-sectional shapes. As shown in FIG. 3, the cutting board 120 may include a first channel 232 and a second channel 234. The first channel 232 and the second channel 234 may define a flattened triangle profile such that the base of the triangle lies on the second plane 128. In some embodiments, the first channel 232 may engage a first rod 231 and the second channel 234 may engage a second rod 233. The first rod 231 and the second rod 233 are diamond shaped and include corner angles that match the first channel 232 and the second channel 234 such that the first rod 231 and the second rod 233 may sit flush within either of the first channel 232 and the second channel 234. While the first rod 231 and the second rod 233 are shown as having a diamond cross-section, it should be understood that the first rod 231 and the second rod 233 may define a different cross-sectional shape, such as a square, rhombus, oval, circle, triangle, and the like. As shown in FIG. 4, in some embodiments, cutting board 120 includes a first channel 332 and a second channel 334, the first channel 332 and the second channel 334 defining a trapezoidal cross-section, the base of the trapezoid (e.g., the longest side) lying within the second plane 128. As shown in FIG. 5, in some embodiments, the cutting board 120 incudes a first channel 432 and a second channel 434. Both of the first channel 432 and the second channel 434 may define a profile having the shape of a semicircle stacked on a rectangle such that a height of the first channel 432 is approximately equal to a width of the first channel 432.

In some embodiments, the first channel 132 and the second channel 134 are contiguous. For example, the first channel 132 and the second channel 134 (e.g., the first channel 232 and the second channel 234; the first channel 332 and the second channel 334; the first channel 432 and the second channel 434) may meet at a point 152 (FIG. 3). While the point 152 is shown between the first channel 232 and the second channel 234, it should be appreciated that the point 152 may be interposed between any of the channels outlined above. When the first channel 132 and the second channel 134 meet at a point (e.g., the point 152), the first channel width 150, the second channel width 151 and the channel gap 136 are equal to one another. In some embodiments, a portion of the third surface 126 lying within the second plane 128 lies between the first channel 132 and the second channel 134. For example, when the channel gap 136 is greater than the channel widths 150, 151, a portion of the third surface 126 lies between the first channel 132 and the second channel 134. In some embodiments, the channel gap 136 is between 100-200% of the width of the channels 130 (e.g., the widths 150, 151). In some embodiments, the first channel width 150 is approximately equal to the rod width 138. In some embodiments, the first channel width 150 is greater than the rod width 138. Similarly, the second channel width 151 may be equal to or greater than the rod width 138.

Figure 6:
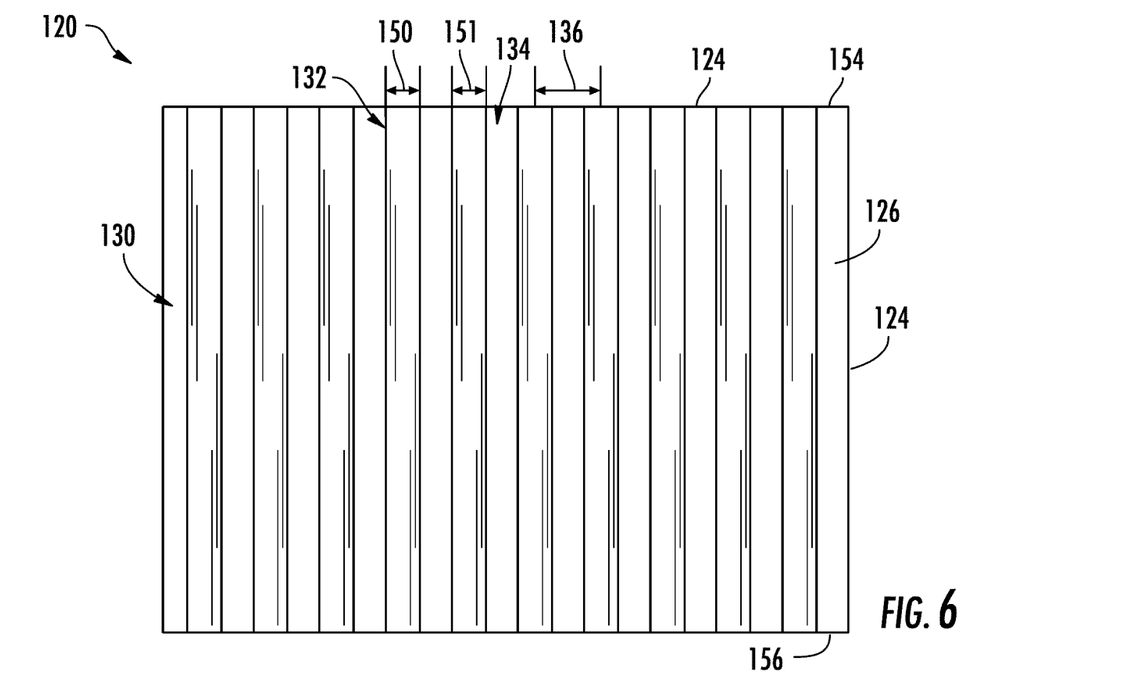
FIG. 6 is a bottom view of the cutting board of FIG. 1, according to an example embodiment.

Turning now to FIG. 6, a bottom view of the cutting board 120 is shown according to an exemplary embodiment. The third surface 126 defines a first edge 154 and a second edge 156. The first channel 132 extends from the first edge 154 to the second edge 156, interrupting the second surface 124 at both the first edge 154 and the second edge 156. The first channel 132 may extend in a direction substantially perpendicular to both the first edge 156 and the second edge 156. Similarly, the second channel 134 extends between the first edge 154 and the second edge 156, interrupting the second surface 124 at both the first edge 154 and the second edge 156. While the first edge 154 and the second edge 156 are shown as being linear and parallel, it should be understood that the first edge 154 and the second edge 156 may take any form or any path. For example, the third surface 126 may define a circle or oval having a curved first edge 154 and a curved second edge 156.

Figure 7:
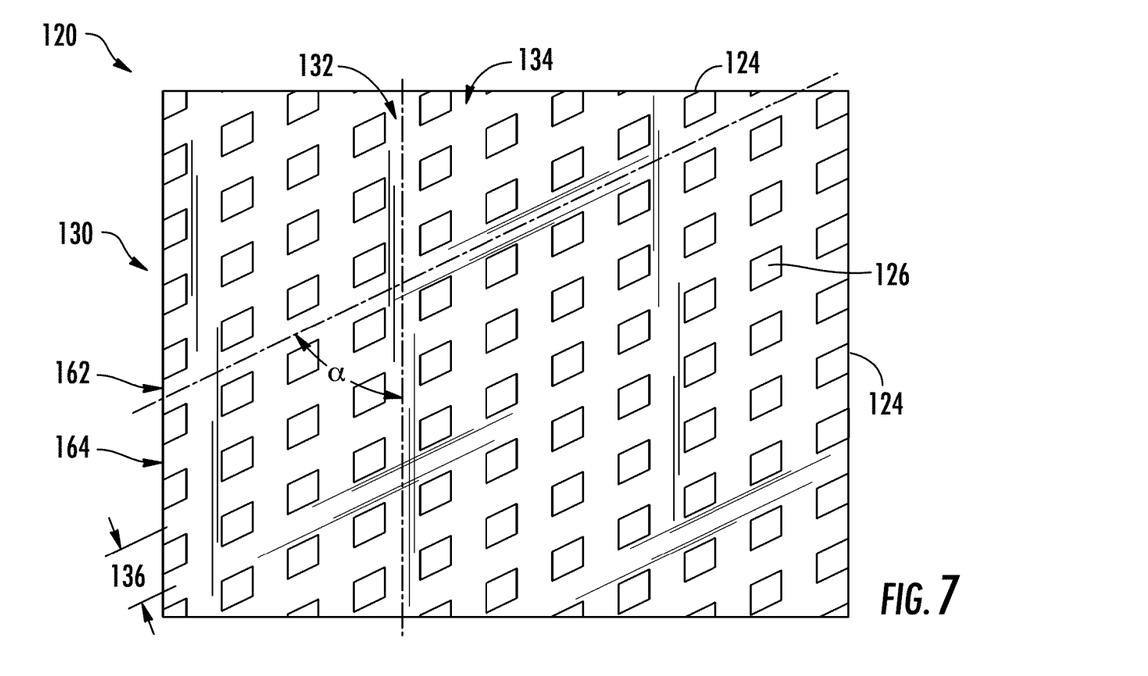
FIG. 7 is a bottom view of the cutting board of FIG. 1, according to another example embodiment.

Turning now to FIG. 7, a bottom view of the cutting board 120 is shown according to another example embodiment. The cutting board 120 may include a third channel 162 and a fourth channel 164. The third channel 162 and the fourth channel 164 may be substantially similar to the first channel 132 and the second channel 134, respectively. The third channel 162 and the fourth channel 164 are separated by the channel gap 136. In some embodiments, the third channel 162 and the fourth channel 164 are separated by a distance different from the channel gap 136. For example, a second drying rack having a plurality of parallel rods separated by a distanced different from the rod gap 110 may be received within the third channel 162 and the fourth channel 164. The third channel 162 and the fourth channel 164 may intersect both the first channel 132 and the second channel 134 at an angle, shown as a first angle α. In some embodiments, the first angle α is approximately 90 degrees such that the first channel 132 is substantially perpendicular to the third channel 162. In some embodiments, the first angle α is between 0-90 degrees, exclusive. The third channel 162 intersect the second perimeter of the third surface 126 at two intersection points such that the third channel 162 is a "through channel" that has open ends where the third channel 162 interrupts the second surface 124. The fourth channel 164 also intersects the second perimeter of the third surface 126 at two intersection points such that the fourth channel 164 is a "through channel" that has open ends where the fourth channel 164 interrupts the second surface 124.

The third channel 162 and the fourth channel 164 may receive the first rod 142 and the second rod 144 such that the cutting board 120 may be positioned at the first angle α relative to the first channel 132 and the second channel 134. As shown in FIG. 4, diamond-shaped portions of the third surface 126 are positioned between the channels 130. In some embodiments, such as when the channel gap 136 is substantially equal to the width of each of the channels 130, all of the first channel 132, the second channel 134, the third channel 162, and the fourth channel 164 may be contiguous with one another and meet at the point 152 in the second plane 128.

Figure 8:
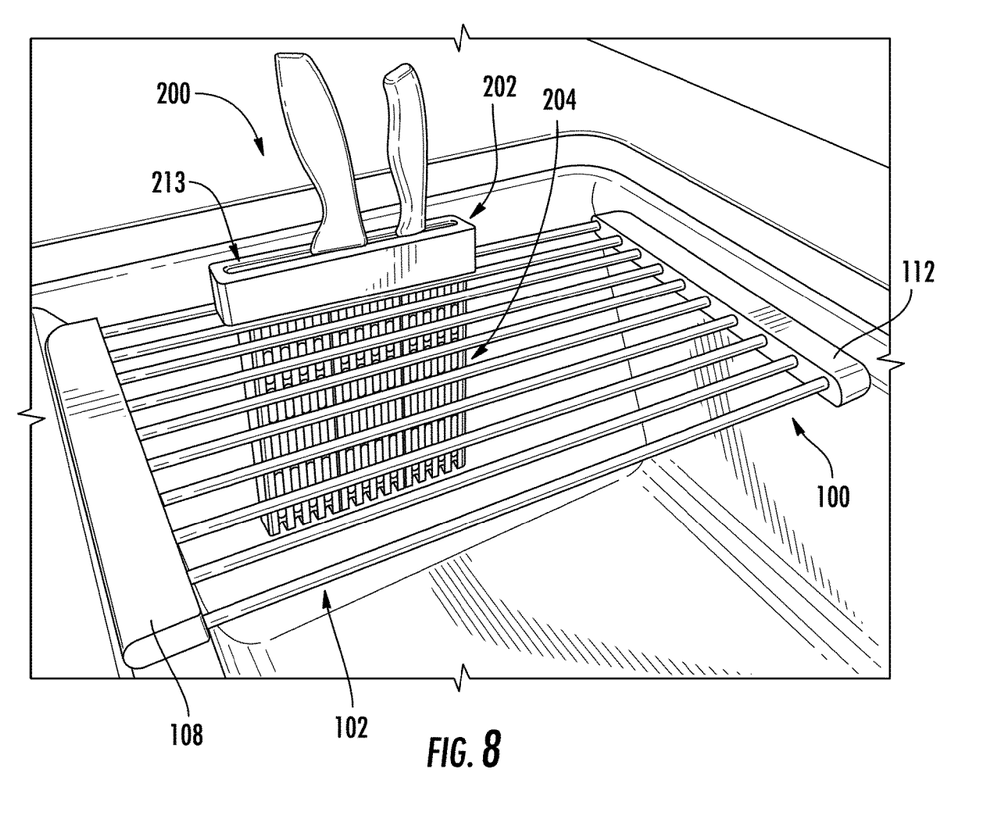
FIG. 8 is a perspective view of a knife holder for use with the drying rack of FIG. 1.

Referring generally to FIGS. 8-15, a knife holder 200 is shown, according to an example embodiment. The knife holder 200 is configured for use with the drying rack 100. The first strap 108 and the second strap 112 of the drying rack 100 of FIG. 8 are shown as being rigid. For example, the first strap 108 and the second strap 112 may be formed of plastic, wood, metal, or a similar rigid material such that the plurality of parallel rods 102 are maintained in their relative positions relative to one another. It should be appreciated that the knife holder 200 may be used with either the drying rack 100 of FIG. 1 and/or the drying rack 100 of FIG. 8. A portion of the knife holder 200 extends through the drying rack 100 and is configured to receive a kitchen utensil, such as a knife, silverware, a spatula, or a similar utensil. For example, a knife may be positioned within the knife holder 200 to dry the knife. The knife holder 200 includes a plurality of apertures configured to allow air to flow through and facilitate drying of the knife and draining of any water or debris that may enter the knife holder 200. The knife holder 200 includes a first portion 202 (e.g., top portion) and a second portion 204 (e.g., sheath portion). The first portion 202 and the second portion 204 are removably coupled to one another such that a knife may extend through the first portion 202 and extend into the second portion 204.

Figure 9:
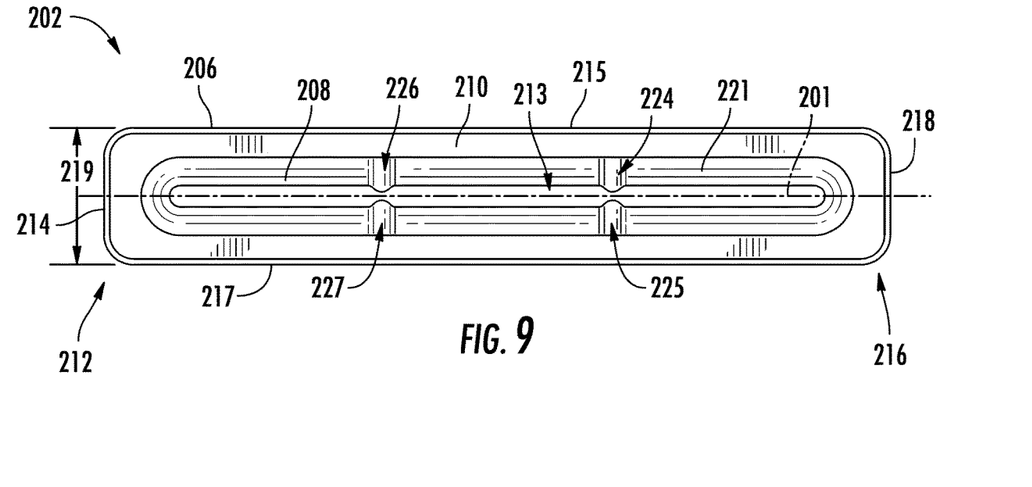
FIG. 9 is a top view of the knife holder of FIG. 5.
Figure 10:
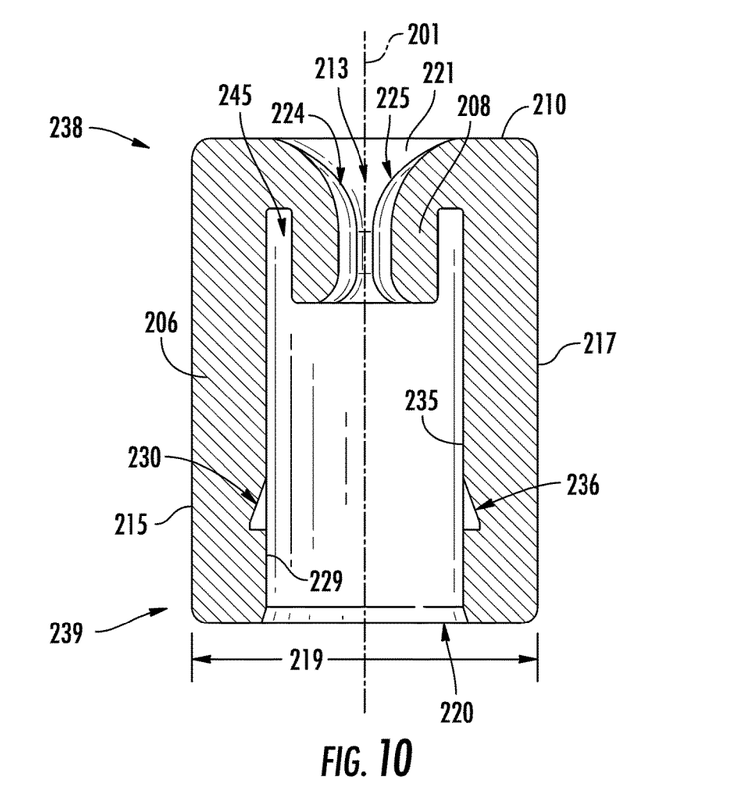
FIG. 10 is a side, cross-sectional view of a portion of the knife holder of FIG. 5.

Referring now to FIGS. 9 and 10, the first portion 202 defines an outer wall 206, an inner wall 208, and a top wall 210. The outer wall 206 defines a rectangular shape having rounded corners. In some embodiments, the outer wall 206 has the shape of a racetrack (e.g., two semicircles connected by straight and parallel lines). The outer wall 206 defines a first end 212 having a first end surface 214 and a second end 216 having a second end surface 218, the second end 216 being positioned opposite to the first end 212. In some embodiments, the first end surface 214 and the second end surface 218 are substantially parallel to one another. Extending between the first end 212 and the second end 216 are a first side surface 215 and a second side surface 217 separated by a first portion width 219. The first portion width 219 is greater than the rod gap 110. In some embodiments, the first portion width 219 is greater than both the rod gap 110 and the rod distance 137. The first portion width 219 is structured to prevent the knife holder 200 from sliding through the drying rack 100 when the knife holder 200 is extended between the first rod 142 and the second rod 144. In some embodiments, the first side surface 215 and the second side surface 217 are substantially parallel to one another. The first side surface 215 is contiguous with both the first end surface 214 and the second end surface 218. Similarly, the second side surface 217 is contiguous with both the first end surface 214 and the second end surface 218. Positioned between the first side surface 215 and the second side surface 217 is a central plane 201. The central plane 201 extends through and bisects the first end surface 214 and the second end surface 218. Herein, the central plane 201 is used as a reference plane.

The inner wall 208 is positioned within the outer wall 206 and is surrounded by the outer wall 206. In some embodiments, the inner wall 208 has a similar cross-sectional shape to the outer wall 206 when a cross-section is taken perpendicularly to the central plane 201. The top wall 210 is coupled to both the outer wall 206 and the inner wall 208. The top wall 210 extends between the first end 212 and the second end 216. The top wall 210 bridges a gap between the outer wall 206 and the inner wall 208. Proximate to an upper end 238 of the first portion 202, a first opening 213 is defined by the inner wall 208 and is intersected by the central plane 201. In some embodiments, the first opening 213 is bisected by the central plane 201. Proximate to the lower end 239 of the first portion 202, the outer wall 206 defines a second opening 220 intersected by the central plane 201. In some embodiments, the second opening 220 is bisected by the central plane 201. The second opening 220 is in fluid communication with the first opening 213. The second opening 220 is further configured to receive an end of the second portion 204.

A tapered surface 221 extends into the first opening 213 and is configured to direct objects, such as kitchen utensils, into the first portion 202. The tapered surface 221 extends across both the top wall 210 and the inner wall 208. A first guide projection 224 extends away from the inner wall 208 and in a direction toward the central plane 201. A second guide projection 225 extends away from the inner wall 208 opposite to the first guide projection 224, the second guide projection 225 extending in a direction toward the first guide projection 224 but not interfacing with the first guide projection 224. The first guide projection 224 and the second guide projection 225 may provide a barrier (e.g., border, marker) between two compartments of the first opening 213, shown as a first compartment 272 and a second compartment 274. In some embodiments, the first guide projection 224 and the second guide projection 225 extend all the way across the first opening 213, forming a bridge across the first opening 213. Separation of the first compartment 272 and the second compartment 274 may better facilitate drying of a utensil that is positioned within the knife holder 200. In some embodiments, a third guide projection 226 extends away from the inner wall 208 in a direction toward the central plane 201. A fourth guide projection 227 may extend away from the inner wall 208 opposite to the third guide projection 226, the fourth guide projection 227 extending in a direction toward the third guide projection 226 but not interfacing with the third guide projection 226. The third guide projection 226 and the fourth guide projection 227 may provide a barrier between two compartments of the first opening 213, shown as the second compartment 274 and a third compartment 276. In some embodiments, the third guide projection 226 and the fourth guide projection 227 extend all the way across the first opening 213, forming a bridge across the first opening 213. All of the first guide projection 224, the second guide projection 225, the third guide projection 226, and the fourth guide projection 227 are contiguous with the tapered surface 221.

Extending into a first inner surface 229 of the outer wall 206 is a first cut-out 230 configured to receive a portion of the second portion 204 to retain the second portion 204 within the first portion 202. The first cut-out 230 extends into the first inner surface 229 in a direction away from the central plane 201. In some embodiments, the first cut-out 230 is positioned nearer to the lower end 239 than to the upper end 238. The first inner surface 229 may be parallel to the first side surface 215. In some embodiments, the first cut-out 230 extends continuously between the first end 212 and the second end 216. In some embodiments, the first cut-out 230 is interrupted by substantially planar sections of the first inner surface 229. Extending into a second inner surface 235 of the outer wall 206 is a second cut-out 236 configured to receive a portion of the second portion 204 to retain the second portion 204 within the first portion 202. The second cut-out 236 extends into the second inner surface 235 in a direction away from the central plane 201. The second inner surface 235 may be parallel to the second side surface 217. The second cut-out 236 is positioned opposite to the first cut-out 230. In some embodiments, the second cut-out 236 extends continuously between the first end 212 and the second end 216. In some embodiments, the second cut-out 236 is interrupted by substantially planar sections of the second inner surface 235.

The outer wall 206, the inner wall 208, and the top wall 210 cooperate to define a first portion cavity 245 configured to receive an end of the second portion 204. The first portion cavity 245 surrounds the inner wall 208 and the first portion cavity 245 is surrounded by the outer wall 206. In some embodiments, the first portion cavity 245 is positioned nearer to the upper end 238 than to the lower end 239.

Figure 11:
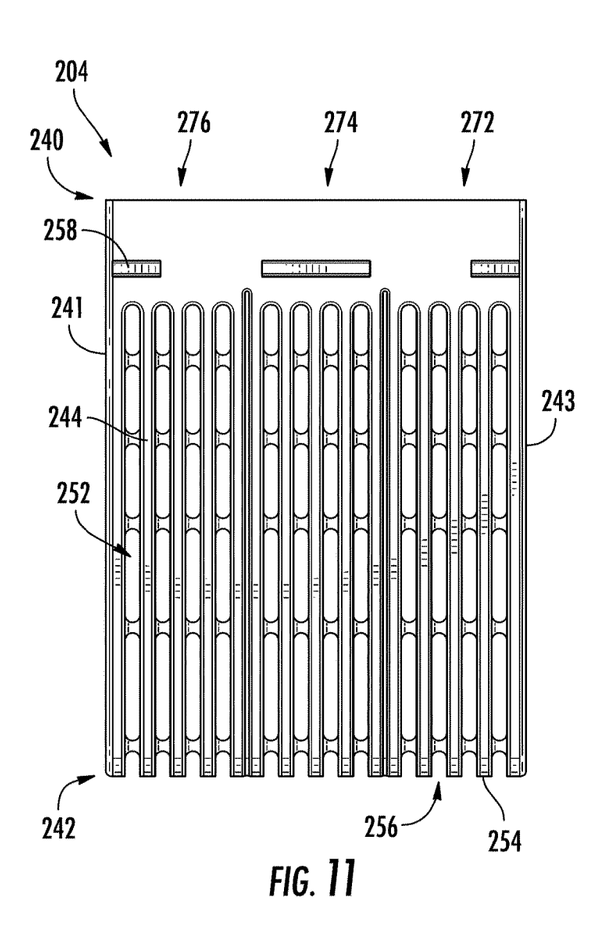
FIG. 11 is a front view of a portion of the knife holder of FIG. 5.
Figure 12:
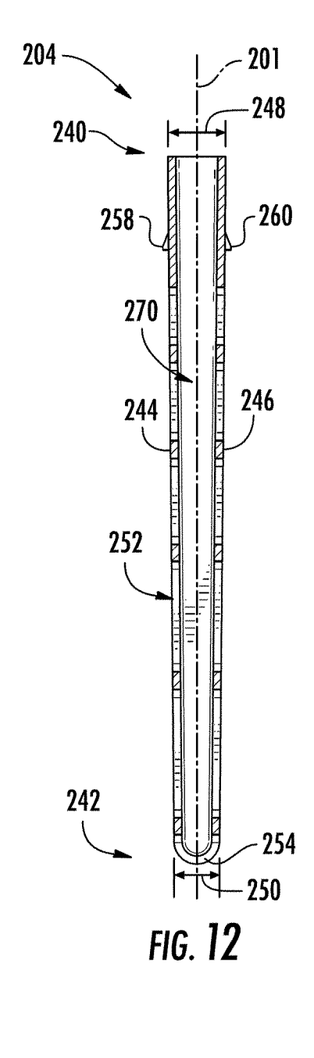
FIG. 12 is a side, cross-sectional view of the portion of the knife holder of FIG. 9.
Figure 13:
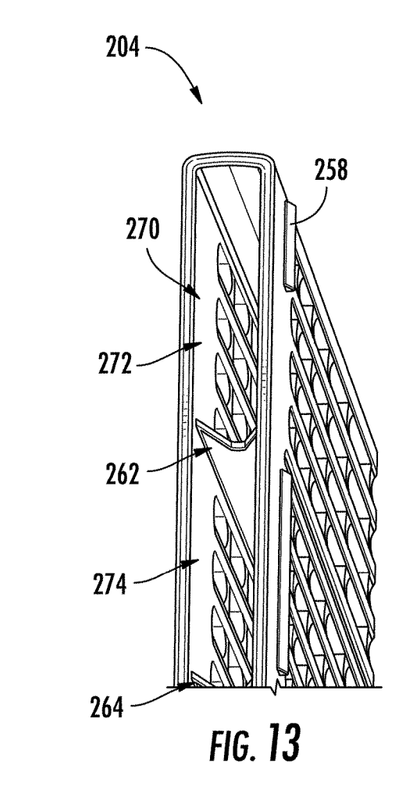
FIG. 13 is a detailed top perspective view of the portion of the knife holder of FIG. 9.

Turning now to FIGS. 11-13, the second portion 204 is shown. The second portion 204 is configured to be removably coupled with the first portion 202. The second portion 204 includes an open (e.g. first) end 240 and a closed (e.g., second) end 242. The first portion 202 is configured to receive the open end 240 via the second opening 220. Specifically, the open end 240 is structured for coupling with the first portion 202 and for being received within the first portion cavity 245.

A first wall 244 and a second wall 246 extend between the open end 240 and the closed end 242. In some embodiments, both the first wall 244 and the second wall 246 are substantially planar. Proximate to the open end 240, the first wall 244 and the second wall 246 are separated by a distance, shown as a first width 248. Proximate to the closed end 242, the first wall 244 and the second wall 246 are separated from each other by a distance, shown as a second width 250. In some embodiments, the first wall 244 and the second wall 246 are parallel to one another such that the first width 248 and the second width 250 are approximately equal to one another. In some embodiments, the first wall 244 and the second wall 246 are tapered toward each other proximate to the closed end 242 such that the first width 248 is greater than the second width 250. In some embodiments, both the first width 248 and the second width 250 are less than the rod gap 110. In some embodiments, the first width 248 is greater than the rod gap 110 and the second width 250 is less than the rod gap 110 such that the closed end 242 may fit between the first rod 142 and the second rod 144, but the open end 240 may not fit between the first rod 142 and the second rod 144.

Positioned between the first wall 244 and the second wall 246 is a receiver cavity 270 configured to receive a kitchen utensil, such as a knife. The open end 240 is open such that the utensil may be inserted through the open end 240 and into the receiver cavity 270. The closed end 242 is closed to prevent objects from falling all the way through the second portion 204 and out of the receiver cavity 270.

The knife holder 200 further includes a first sidewall 241 that extends between the open end 240 and the closed end 242. The first sidewall 241 is closed and contiguous with both the first wall 244 and the second wall 246. Opposite to the first sidewall 241 is a second sidewall 243 extending between the open end 240 and the closed end 242. The second sidewall 243 is closed and contiguous with both the first wall 244 and the second wall 246. In some embodiments, the first sidewall 241 and the second sidewall 243 are parallel to one another. In some embodiments, the first sidewall 241 and the second sidewall 243 are tapered toward each other proximate to the closed end 242 such that a distance between the first sidewall 241 and the second sidewall 243 proximate to the open end 240 is greater than a distance between the first sidewall 241 and the second sidewall 243 proximate to the closed end 242.

The first wall 244 includes a side aperture 252. The side aperture 252 extends through the first wall 244 and is in fluid communication with the receiver cavity 270. As shown in FIG. 8, the first wall 244 is profiled with a plurality of side apertures 252. The plurality of side apertures 252 are structured to allow air to circulate throughout the receiver cavity 270 to facilitate the drying of a utensil inserted within the receiver cavity 270. A similar side aperture 252 may extend through the second wall 246. In some embodiments, the first wall 244 an the second wall 246 are symmetrical about the central plane 201 such that air may flow through the side aperture 252 in the first wall 244, through the receiver cavity 270, and out the side aperture 252 in the second wall 246.

Proximate to the closed end 242 is a catch wall 254. The catch wall 254 is coupled to and contiguous with the first wall 244, the second wall 246, the first sidewall 241, and the second sidewall 243. The catch wall 254 may be solid (e.g., closed) such that no object or fluids may exit the receiver cavity 270 via the catch wall 254. In some embodiments, the catch wall 254 includes a drain aperture 256 extending through the catch wall 254 and in fluid communication with the receiver cavity 270.

Extending away from the first wall 244 proximate to the open end 240 is a first projection (e.g., coupling projection) 258. The first projection 258 extends orthogonally away from the second portion 204 proximate to the open end 240. The first projection 258 is configured to selectively couple the first portion 202 to the second portion 204. Specifically, the first projection 258 is structured to extend into the first cut-out 230 of the first portion 202 such that the first portion 202 is prevented from moving axially away from the second portion 204. In some embodiments, the 200 is positioned within a drying rack, such as the drying rack 102, such that the 200 is supported by the first portion 202. In such embodiments, the first projection 258 provides a coupling force between the first portion 202 and the second portion 204 great enough to support the weight of the second portion 204. The first projection 258 extends into the first cut-out 230 when the open end 240 is positioned within the first portion cavity 245. In some embodiments, the first projection 258 extends between the first sidewall 241 and the second sidewall 243 uninterrupted. In some embodiments, such as shown in FIG. 8, the first projection 258 is interrupted by a portion of the first wall 244 having no feature (e.g., a planar section of the first wall 244). The first projection 258 may extend between the first sidewall 241 and the second sidewall 243 substantially parallel to the open end 240. A second projection 260, similar to the first projection 258, extends away from the second wall 246. In some embodiments, the second projection 260 extends between the first sidewall 241 and the second sidewall 243 uninterrupted. In some embodiments, the second projection 260 is interrupted by a portion of the second wall 246 having no feature (e.g., a planar section of the second wall 246). The second projection 260 may extend between the first sidewall 241 and the second sidewall 243 substantially parallel to the first projection 258.

Referring to FIG. 13, a first partition 262 is shown positioned within the receiver cavity 270. The first partition 262 is coupled to and extends between the first wall 244 and the second wall 246. The first partition 262 separates the receiver cavity 270 in a plurality of compartments. Positioned between the first partition 262 and the second sidewall 243 is a first compartment 272 which is a portion of the receiver cavity 270. The first partition 262 may be formed of the same material that the first wall 244 and the second wall 246 are formed of. In some embodiments, the knife holder 200 includes a second partition 264 positioned within the receiver cavity 270. The second partition 264 may cooperate with the first partition 262 to separate the receiver cavity 270 into a second compartment 274, the second compartment 274 being positioned between the first partition 262 and the second partition 264 and the second compartment 274 being a portion of the receiver cavity 270. In some embodiments, the receiver cavity 270 is further separated into a third compartment 276 positioned between the second partition 264 and the first sidewall 241. In some embodiments, the distances between the first sidewall 241 and the second partition 264, the second partition 264 and the first partition 262, and the first partition 262 and the second sidewall 243 are all approximately the same such that the first compartment 272, the second compartment 274, and the third compartment 276 are all approximately the same size (e.g., define the same volume).

Figure 14:
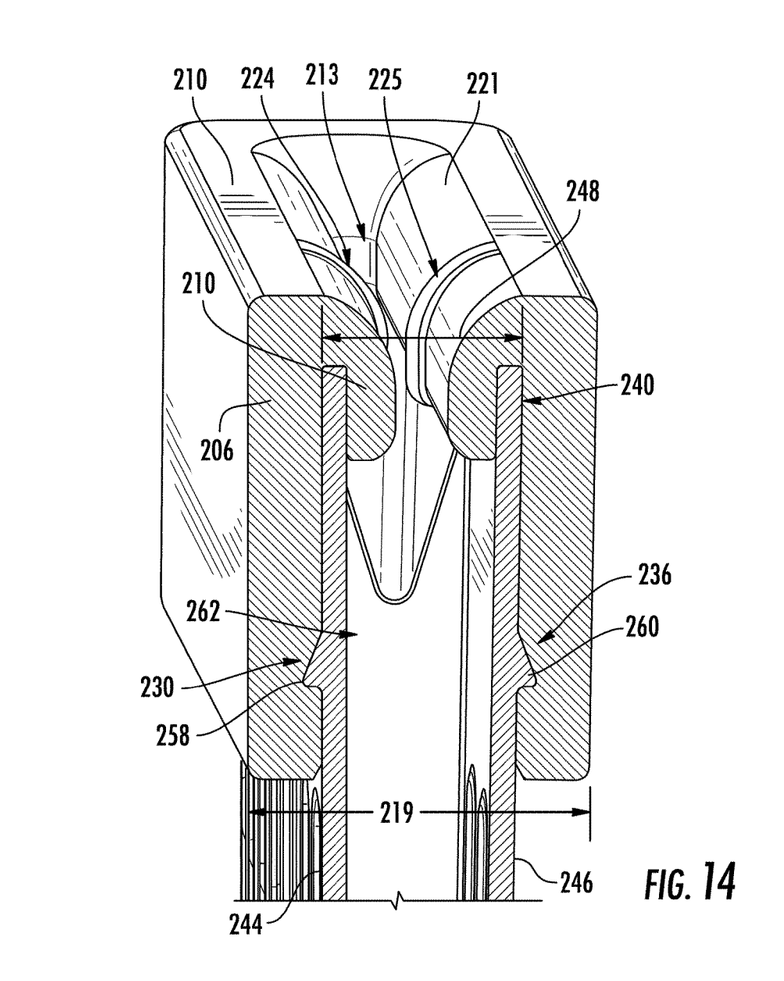
FIG. 14 is a detailed, perspective cross-sectional view of the knife holder of FIG. 5.

Referring to FIG. 14, a perspective, cross-sectional view of the knife holder 200 is shown with the first portion 202 coupled to the second portion 204. The first projection 258 is received within the first cut-out 230 and the second projection 260 is received within the second cut-out 236. Further, the open end 240 of the second portion 204 is received within the first portion cavity 245. The first partition 262, the first guide projection 224, and the second guide projection 225 are all positioned in line with each other to separate the first compartment 272 from the second compartment 274. In some embodiments, the first partition 262 is difficult for a user to see when the knife holder 200 is positioned within the drying rack 100. Thus, the first guide projection 224 and the second guide projection 225 provide a visual indication of where the first partition 262 is located while also serving as an additional barrier provided with the first portion 202.

Figure 15:
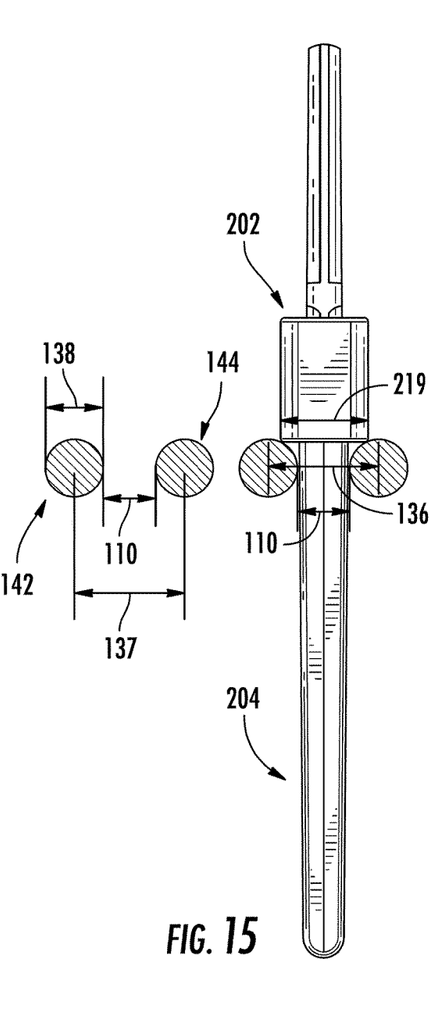
FIG. 15 is a side, cross-sectional view of the knife holder of FIG. 5 positioned though the drying rack of FIG. 1.

Referring now to FIG. 15, the knife holder 200 is shown positioned within the drying rack 100 such that the second portion 204 extends through the drying rack 100 and the first portion 202 interfaces with the drying rack 100. The second portion 204 is structured such that at least a portion of the second portion 204 may be positioned between first rod 142 and the second rod 144. The first portion width is shown as being less than the rod distance 137 and greater than the rod gap 110. In some embodiments, the first portion width 219 is greater than the rod distance 137. When the first portion 202 is coupled with the second portion 204, the first portion 202 prevents the second portion 204 from falling through the drying rack 100. The first portion 202 and the second portion 204 may be formed of plastic, wood, metal, or a similar material. In some embodiments, the first portion 202 and the second portion 204 are formed of a single body such that the knife holder 200 is a single piece that cannot be separated into multiple pieces without destroying the knife holder.

Figure 16:
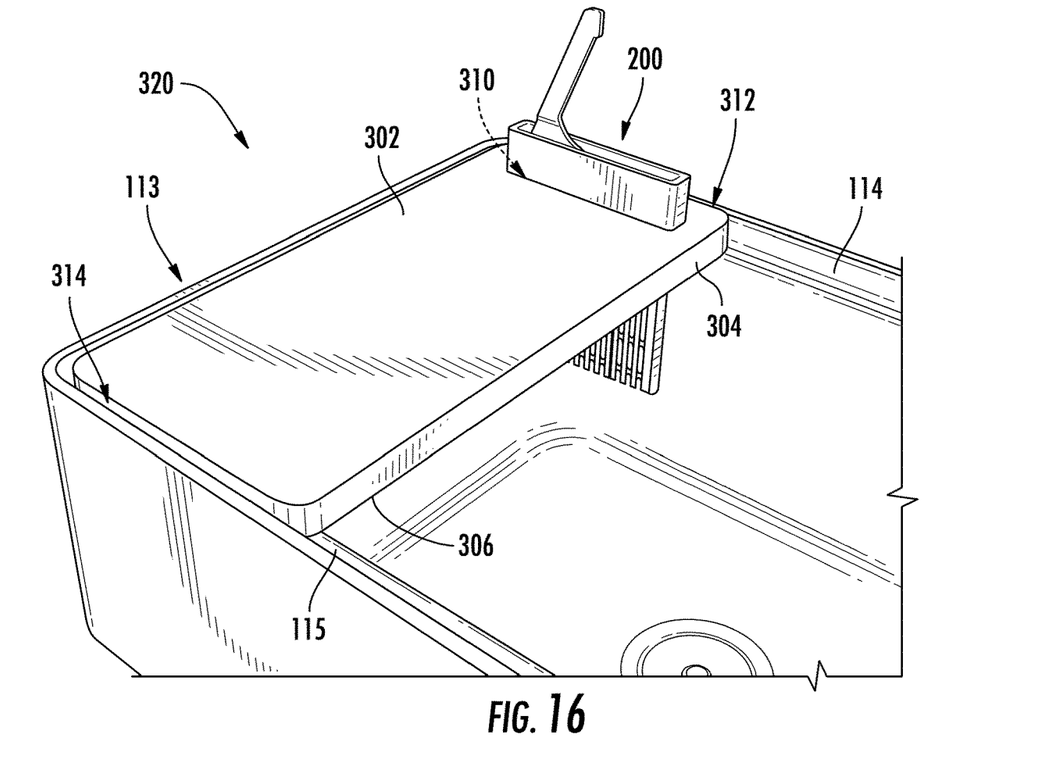
FIG. 16 is a perspective view of a cutting board according to an example embodiment having the knife holder of FIG. 8.

Turning now to FIG. 16, a perspective view of a cutting board 300 is shown. The cutting board 300 defines a first surface 302 (e.g., top surface, cutting surface, etc.), a second surface 304 (e.g., side surface, perimeter surface, etc.), and a third surface 306 (e.g., bottom surface, reverse cutting surface, etc.). The cutting board 300 is sized to extend across the opening in the sink 113 and rest on the pair of ledges 114, 115. The cutting board 300 defines a first end 312 and a second end 314 opposite to the first end 312 where the first end 312 engages with the ledge 114 and the second end 314 engages with the ledge 115. Extending through the first surface 302 and the second surface 304 is an opening 310 configured to receive the knife holder 200. More specifically, the opening 310 is sized to allow the second portion 204 to pass through while preventing the first portion 202 from passing through. In some embodiments, the opening 310 defines a width, such as the rod gap 110. Thus, the knife holder 200 may be retained within the opening 310. In some embodiments, the opening 310 is positioned nearer to one end of the cutting board 200 than the other. For example, as shown in FIG. 16, the opening 310 is positioned nearer to the first end 312 of the cutting board 200 than to the second end 314. The opening 310 defines a rectangular slot that may extend substantially parallel to the first end 312. In some embodiments, the cutting board 300 includes a second opening similar to the opening 310. The second opening may be positioned nearer to the second end 314 of the cutting board 300 than to the first end 312. The opening 310 and the second opening may be positioned opposite one another such that the cutting board 300 exhibits symmetry about a central axis positioned between the opening 310 and the second opening and extending substantially parallel to the opening 310. The opening 310 and the second opening may serve as handles that a user may interact with to lift the cutting board 300. In some embodiments, the opening 310 is positioned inward from the first end 312 such that the ledge 114 is not visible through the opening 310. In other words, a width of a portion of the cutting board 300 positioned between the opening 310 and the first end 312 may be approximately equal to or greater than the width of the ledge 114 such that a user's fingers do not interface with the ledge 114 when the user reaches through the opening 310 to lift the cutting board 300 from the sink 113. The same may be true in embodiments where a second opening is positioned opposite to the opening 310.

Figure 17:
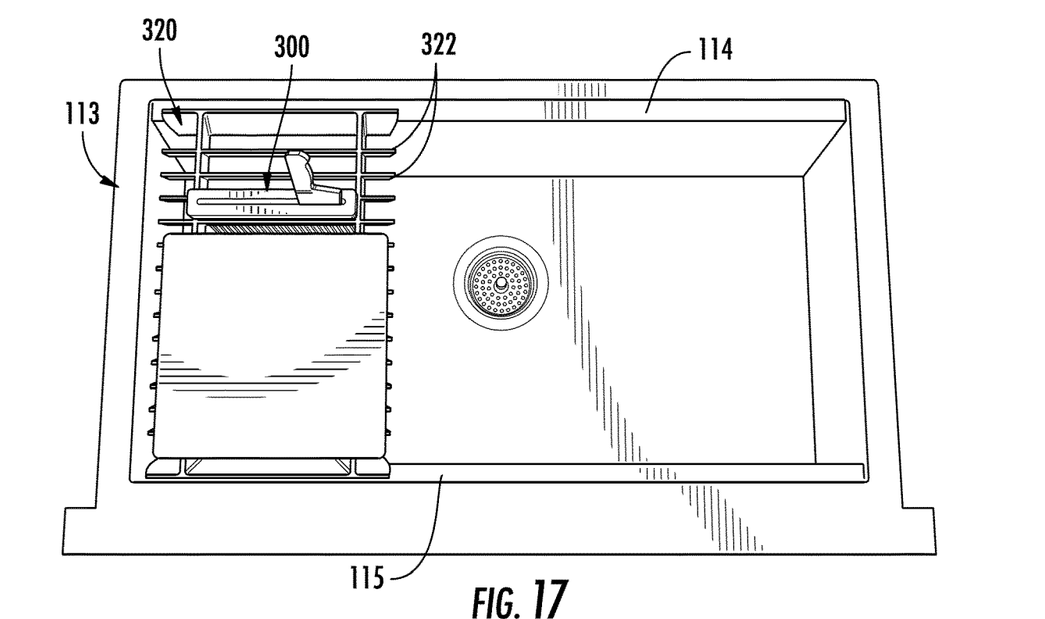
FIG. 17 is a top perspective view of the knife holder of FIG. 8 positioned within a drying rack according to an example embodiment.

Turning now to FIG. 17, a top perspective view of a rack 320 is shown. The rack 320 is similar to both the rack 100 and the cutting board 300 in that the rack 320 extends across an opening of the sink 113 and rests on the pair of ledges 114, 115. The rack 320 includes a plurality of slats 322 that extend parallel to the pair of ledges 114, 115 and are separated by a distance, such as the rod gap 110. The knife holder 200 may be extended through the plurality of slats 200 such that the second portion 204 extends through the plurality of slats 322 and the first portion 202 rests on the plurality of slats 322.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A cutting board comprising:
a first surface substantially planar and uninterrupted, and lying within a first plane, the first surface comprising a first perimeter;
a second surface extending away from the first surface proximate to the first perimeter;
a third surface lying within a second plane, the third surface comprising a second perimeter; and
three generally parallel channels, each channel extending along the second plane and interrupting the third surface, each channel including a channel width and each channel separated by a channel gap, wherein a width of each channel gap is between one hundred percent and two hundred percent of the channel width.

2. The cutting board of claim 1, wherein each of the channels are configured to receive a portion of a drying rack.

3. The cutting board of claim 1, wherein each channel includes a height, and wherein each channel width is greater than each channel height.

4. The cutting board of claim 1, further comprising:
a first edge; and
a second edge opposite to and substantially parallel to the first edge;
wherein the three channels extend from the first edge to the second edge in a direction substantially perpendicular to the first edge and the second edge.

5. The cutting board of claim 1, wherein each channel has a substantially semi-circular profile.

6. The cutting board of claim 1, wherein each channel has a substantially trapezoidal profile.

7. The cutting board of claim 1, wherein each of the channels are substantially linear and intersect the second perimeter at two intersection points.

8. An assembly comprising:
a drying rack comprising three generally parallel rods, each rod separated by a gap distance, and each rod defining a rod width;
a cutting board comprising a substantially planar cutting surface and an engagement surface opposite to the cutting surface, the engagement surface comprising three channels configured to receive the three rods, wherein each of the three channels extend into the cutting board in a direction away from the engagement surface and toward the cutting surface.

9. The assembly of claim 8, wherein at least one channel defines a channel width and a channel height, the channel width being greater than the rod width, and the channel height being less than the rod width.

10. The assembly of claim 8, wherein the engagement surface comprises a series of more than three channels arranged on the entirety of the engagement surface, the series of channels extending from a first end of the engagement surface to a second end of the engagement surface.

11. The assembly of claim 10, wherein each of the channels are separated by the gap distance.

* * * * *